United States Patent [19]

Butler-Smith

[11] Patent Number: 4,593,919
[45] Date of Patent: Jun. 10, 1986

[54] ROTARY DRILL CHUCK WITH BELLEVILLE SPRING BIASED JAWS WHICH ARE CENTRIFUGALLY BALANCED

[76] Inventor: Paul W. Butler-Smith, Franlaren Farm, Mimosa Rd., Blue Hills, Transvaal, South Africa

[21] Appl. No.: 647,243

[22] Filed: Sep. 4, 1984

[30] Foreign Application Priority Data

Sep. 6, 1983 [ZA] South Africa ............... 83/6604

[51] Int. Cl.$^4$ ............. B23B 31/14; B23B 31/30
[52] U.S. Cl. ................................ 279/4; 279/1 C
[58] Field of Search ............ 279/1 C, 4; 175/195

[56] References Cited

U.S. PATENT DOCUMENTS

| | | | |
|---|---|---|---|
| 1,760,395 | 5/1930 | Brock | 279/4 |
| 3,692,320 | 9/1972 | Lindelof et al. | 279/4 |
| 4,009,888 | 3/1977 | Wallace | 279/1 C |
| 4,275,892 | 6/1981 | Rohm | 279/1 C |
| 4,437,675 | 3/1984 | Koenig, III | 279/1 C |

FOREIGN PATENT DOCUMENTS 2542569  4/1977  Fed. Rep. of Germany ...... 279/1 C

Primary Examiner—Fred Silverberg
Attorney, Agent, or Firm—Birch, Stewart, Kolasch & Birch

[57] ABSTRACT

A rotary rock drilling chuck has three jaws for clamping a drill stem. Each jaw is carried by the step of a piston acting in a cylinder against belleville springs between it and an end cap. A projection from the piston passes through the belleville springs. Three pairs of masses are equally and circumferentially spaced about the clamping axis and acted upon by levers pivoted to the chuck body so that a mass acts upon a pair of levers each of which acts upon a piston to counteract centrifugal force acting on the piston.

1 Claim, 3 Drawing Figures

ROTARY DRILL CHUCK WITH BELLEVILLE SPRING BIASED JAWS WHICH ARE CENTRIFUGALLY BALANCED

BACKGROUND TO THE INVENTION

This invention relates to a rotary drilling chuck suitable for use in diamond drilling.

A rotary drilling chuck which can be released hydraulically and which will fail safe in the absence of hydraulic power has already been proposed in the specification of U.S. Pat. No. 3,692,320. In the latter specification clamping jaws are acted upon by an axially moving chuck hood which in turn is acted upon by belleville springs around pairs of long screws which also extend axially. The result is that the extent to which a rod can drill between successive chucking operations is decreased by the distance which the hood and its associated hydraulic mechanism takes up over the distance which is actually required for clamping.

It is an object of the invention to provide drill chuck which can be released hydraulically and which will fail safe in the absence of hydraulic power, but which occupies a relatively short distance in the drilling direction so that the stroke between chucking events is as large as practicable.

SUMMARY OF THE INVENTION

A rotary rock drilling chuck comprising a body, at least two jaws movable along a clamping line radial to an axis passing through the body, springs biasing the jaws to a clamping position and means for moving the jaws to an unclamped position against the action of the springs by means of hydraulic pressure, is characterised by a cylinder on each clamping line, a piston movable in each cylinder, a stem on each piston carrying a jaw, an end cap to each cylinder and a set of belleville springs acting between each piston and the end cap to its cylinder.

In one form of the invention there is in respect of each piston a mass radially slidable in a cavity in the body and a lever pivoted to the body intermediate the piston axis and the mass axis and pressing on the piston and the mass so that centrifugal force acting on the mass causes the mass to act on the lever which in turn acts on the projection to counteract centrifugal force acting on the piston.

In the preferred form of the invention there are three jaws and pairs of masses spaced equally and circumferentially about the axis with their lines of action in the same plane with a pair of levers pivoted to each side of each piston so that a piston is acted upon by two levers.

DESCRIPTION OF THE INVENTION

DESCRIPTION OF AN EMBODIMENT

Figure 1:
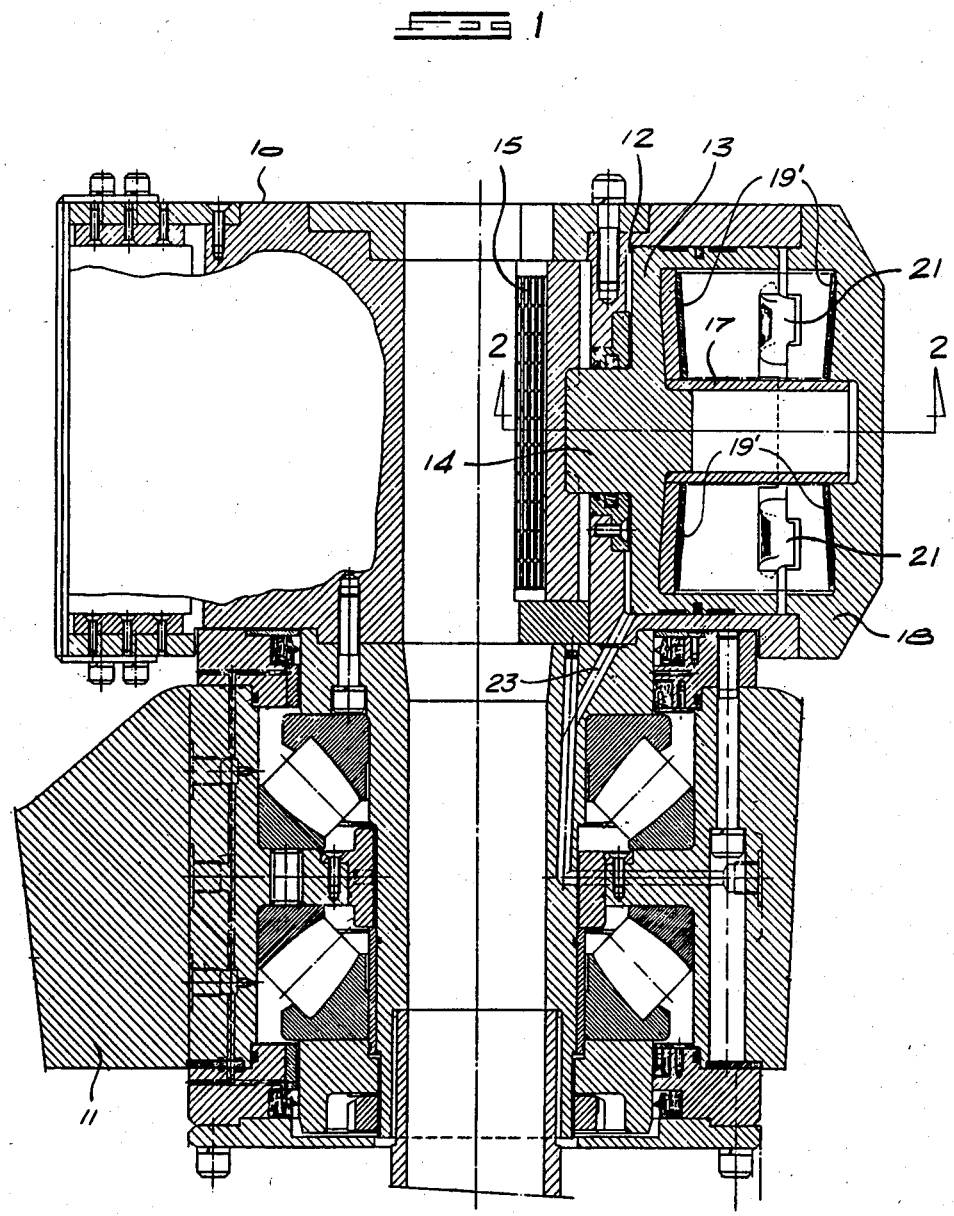
FIG. 1 is a side view of a chuck assembly partly in section.
Figure 2:
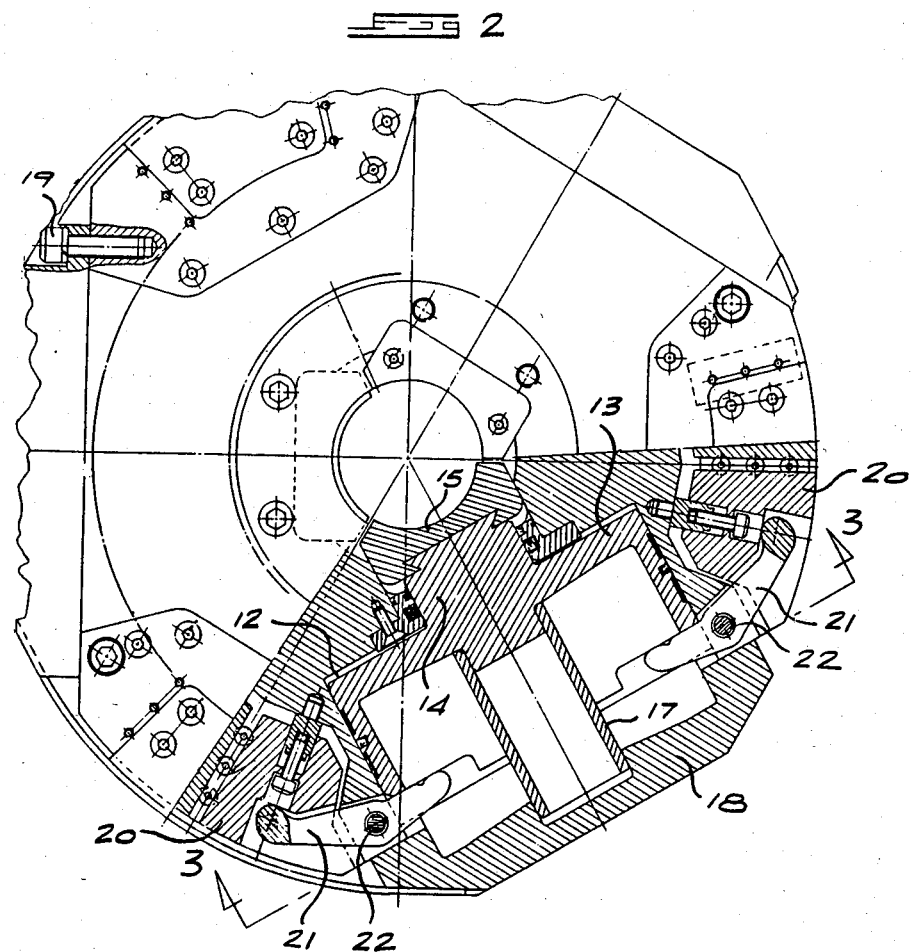
FIG. 2 is an end view with a section on the line 2—2 in FIG. 1.
Figure 3:
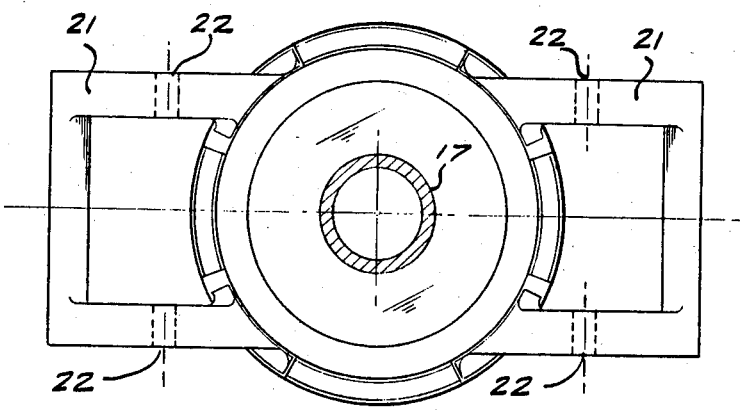
FIG. 3 is a view along the line 3—3 in FIG. 2.

In the illustrated embodiment a chuck head 10 is carried by a nonrotating carrier 11 and driven by means, not shown, in a known manner. In the head there are three cylinders 12 housing three pistons 13 the stems 14 of which carry clamping jaws 15 to clamp a drill string between them. The pistons have projections 17 on them and are held in place by end caps 18 fastened by cap screws 19.

As shown the pistons 13 are hollow. In these hollows and around the projections 17 are a series of belleville springs,, of which two marked 19' shown in FIG. 1, suitably compressed by the end caps 18 to ensure that the jaws 15 clamp the drill string with sufficient force.

The spaces in front of the pistons 13 in the cylinders 12 may be fed with hydraulic fluid under pressure through an inlet 23 by means not shown to slacken the pressure of the jaws 15 against the action of the belleville springs.

At the speed of rotation of, say, a standard drilling machine there is a chance that centrifugal force acting on the pistons 13 and the parts associated with them may cause a slackening of the jaw pressure. To counteract this six counterweights 20 are provided. They are capable of sliding radially in bores in the head 10. U-shaped levers 21 are pivoted at 22 and extend between the counterweights 20 and the rim of a piston 13. Thus as centrifugal force tends to move the weights 20 outwardly the levers 21 press on the pistons to counteract any centrifugal force on the piston assemblies.

I claim:
1. A rotary drilling chuck comprising:
a body,
at least three jaws movable along clamping lines in the same plane radial to a chuck axis passing through the body,
a cylinder on each said clamping line,
a hollow piston movable in each said cylinder and having an axis on a said clamping line,
a stem on each said piston carrying one of said jaws,
an end cap secured on each said cylinder,
a set of belleville springs located in the hollow of each said piston acting between each said piston and said end cap to its said cylinder,
an inlet to each said cylinder for hydraulic fluid under pressure to move said jaws to an unclamped position against the action of said belleville springs,
a mass being located between each pair of said cylinders and being circumferentially spaced therefrom, said mass being slidable along a mass axis radial to said chuck axis in the plane of said clamping lines and in a cavity in said body,
and between each said mass and each adjacent said piston a lever being pivoted to said body and directly acting on a said piston and a said mass and which is so located that centrifugal force acting on said mass causes said mass to act on pairs of said levers which, in turn, act on the pairs of said pistons between which said mass is situated to counteract the radially outward centrifugal force acting on said pistons.

* * * * *